(12) United States Patent
Riggs et al.

(10) Patent No.: US 9,643,526 B2
(45) Date of Patent: May 9, 2017

(54) HORIZONTAL EJECTOR TRUCK BODY

(71) Applicant: J&J Truck Bodies and Trailers, Somerset, PA (US)

(72) Inventors: Sydney W. Riggs, Friedens, PA (US); Ronald E. Wright, Somerset, PA (US); Thomas R. Pletcher, Markleton, PA (US); Michael D. Riggs, Berlin, PA (US)

(73) Assignee: Somerset Welding & Steel, Inc., Somerset, PA (US)

( * ) Notice: Subject to any disclaimer, the term of this patent is extended or adjusted under 35 U.S.C. 154(b) by 9 days.

(21) Appl. No.: 14/960,470

(22) Filed: Dec. 7, 2015

(65) Prior Publication Data

US 2016/0159262 A1 Jun. 9, 2016

Related U.S. Application Data

(60) Provisional application No. 62/089,438, filed on Dec. 9, 2014.

(51) Int. Cl.
*B60P 1/00* (2006.01)
*B65G 67/26* (2006.01)

(52) U.S. Cl.
CPC .............. *B60P 1/006* (2013.01); *B65G 67/26* (2013.01)

(58) Field of Classification Search
CPC ................................ B65G 67/26; B60P 1/006
USPC ....................................................... 414/551
See application file for complete search history.

(56) References Cited

U.S. PATENT DOCUMENTS

| 3,273,728 | A | | 9/1966 | Kelso |
| 3,349,931 | A | | 10/1967 | Vagner |
| 3,613,556 | A | * | 10/1971 | Wright ...................... B30B 9/30 100/14 |
| 3,896,947 | A | | 7/1975 | Pearce |
| 3,941,260 | A | | 3/1976 | Fisher et al. |
| 3,953,170 | A | | 4/1976 | Webb |
| 4,094,424 | A | * | 6/1978 | Harvey .................. B65G 69/22 100/229 A |
| 4,260,317 | A | | 4/1981 | Martin et al. |
| 5,816,766 | A | * | 10/1998 | Clark ....................... B60P 1/26 298/23 M |
| 6,062,804 | A | | 5/2000 | Young et al. |
| 6,079,933 | A | | 6/2000 | Moyna et al. |
| 6,092,973 | A | | 7/2000 | Burnett et al. |
| 6,155,776 | A | | 12/2000 | Moyna |

(Continued)

*Primary Examiner* — Michael McCullough
*Assistant Examiner* — Ashley Romano
(74) *Attorney, Agent, or Firm* — McKay & Associates, PC

(57) ABSTRACT

A horizontal ejection system for a vehicle. An ejector is adapted to travel axially through the interior from the front to the back of the truck body. A hydraulic system includes a hydraulic circuit for moving the ejector, and an ejector signal processing system signals the hydraulic circuit. The ejector signal processing system includes one or more proximity switches for detecting the location of the ejector and triggering the movement of the ejector. The switches are disposed on the truck body to sense the location of both the ejector and the tailgate. As a result, the hydraulic circuit is signaled to control the hydraulic system and thereby move the ejector based on a position of the ejector and the tailgate, wherein, in combination, the ejector and the tailgate control a load of material within the truck body.

10 Claims, 10 Drawing Sheets

(56) References Cited

U.S. PATENT DOCUMENTS

| | | | |
|---|---|---|---|
| 6,374,606 B1* | 4/2002 | Fallon | F15B 15/16 60/486 |
| 6,382,535 B1 | 5/2002 | Kime | |
| 7,326,023 B2 | 2/2008 | Hagenbuch | |
| 7,488,148 B2 | 2/2009 | Byrne | |
| 7,563,066 B2* | 7/2009 | Jones | B65F 3/28 414/525.2 |
| 7,878,751 B2 | 2/2011 | Hagenbuch | |
| 7,896,605 B2 | 3/2011 | Davis | |
| 7,980,805 B1 | 7/2011 | Holmes et al. | |
| 8,333,543 B1 | 12/2012 | Simmons | |
| 2005/0110330 A1* | 5/2005 | Khan | B60P 1/006 298/22 R |
| 2010/0096469 A1* | 4/2010 | Holverson | E01C 19/2045 239/11 |
| 2013/0321141 A1* | 12/2013 | Ariemma | B60Q 9/00 340/457 |

* cited by examiner detail A detail B

HORIZONTAL EJECTOR TRUCK BODY

CROSS REFERENCE TO RELATED APPLICATIONS

The instant application claims benefit of provisional application Ser. No. 62/089,438, filed Dec. 9, 2014, the contents of which are incorporated herein by reference.

BACKGROUND

Field of the Invention

The present invention relates to truck body systems for hauling aggregate materials such as, but not limited to, gravel, anti-skid, salt, cinders and aggregate. Particularly, disclosed is a horizontal ejection system within a truck body for particulate control, for example snow and ice road maintenance and treating applications, aggregate hauling and road paving and construction.

Description of the Related Art

State, local governments and contractors engaged in road maintenance, more specifically, snow and ice control, are seeking equipment solutions that do not raise up in the air like a standard dump body. These solutions are being sought to mitigate the risk of contact with overhead obstacles such as bridges or power lines while plowing and salting, paving and chipping, and to mitigate the risk of rolling trucks over when dumping on un-level ground or when loads stick in a traditional dump body causing it to become unstable. Presently, there are a number of solutions (combination bodies) on the market that mitigate this risk, such as center conveyor bodies, bodies that have built in augers, etc. However, these solutions are typically high priced, require significant maintenance and can be very costly to repair.

Horizontal load-ejecting vehicles, i.e. in which the load-engaging element is movable parallel to the load-supporting element (bed) are known the art. The pushers are moved by rams actuated by fluid pressure. For instance, U.S. Pat. No. 3,273,728 to Kelso is a rear unloading box. U.S. Pat. No. 3,349,931 is also a telescoping unloading truck. More state-of-the-art systems add to the standard push-ram systems by varying their truck bed floors and beds (U.S. Pat. No. 6,062,804), speed controls (U.S. Pat. No. 6,092,933), and actuation assemblies (U.S. Pat. No. 7,878,751). For example, in U.S. Pat. No. 7,878,751 the tailgate actuation assembly is linked and unlinked from the ejector and responds to movement of the ejector blade.

The above horizontal ejection systems are geared toward the dump truck industry, in which heavy loads are merely dumped from the beds of the vehicles in a relatively uncontrolled fashion since the object is merely to empty the truck body of its contents, typically all at one time. Accordingly, the control systems are suited for this purpose, more so than an application which requires a more controlled environment, such as a truck which is being used to spread road particulate for construction applications or snow and ice control. Such material handling and ejection requires not only more control features, but also features that can be automated so as not to distract the operator who not only must be driving the vehicle, but controlling the amount of material being ejected.

SUMMARY

The invention comprehends a horizontal ejector body for snow and ice control and aggregate hauling system in which the ejector and thus the material is automatically controlled by a combination of the tailgate and the ejector, and not simply the ejector itself. A truck body having an open front bulkhead includes extending front rails supporting a mounting plate. An ejector cylinder is disposed on the mounting plate. A horizontal ejector is in engagement with the ejector cylinder. The truck operator hydraulically actuates the horizontal ejector, pushing material rearward. The material being pushed by the ejector, pushes the tailgate rearward and out over the opening of the tailgate spreader or paving machine allowing material into the material hopper. Therefore, it is an objective of the invention to provide a system to move the ejector based on a position of the ejector and the tailgate, wherein, in combination, the ejector and the tailgate are controlling the load of material with the truck body.

Accordingly, and more particularly, comprehended is an ejection system for a vehicle, comprising a truck body having a front, a back, and an interior. A tailgate is at the back. An ejector is adapted to travel axially through the interior from the front to the back. A hydraulic system includes a hydraulic circuit for moving the ejector, and an ejector signal processing system signals the hydraulic circuit. The ejector signal processing system includes one or more proximity switches. A normally-open, front ejector proximity switch is disposed at the front, the front ejector proximity switch adapted to detect the ejector being in the fully retracted position. A normally-open, rear ejector proximity switch is disposed at the back, the rear ejector proximity switch adapted to detect the ejector being in a fully extended position. A normally-open, pneumatic tailgate switch and a normally-open tailgate proximity switch is in electrical communication with the pneumatic tailgate switch, wherein upon closing of the pneumatic tailgate switch, the tailgate proximity switch is adapted to open or close in response to movement by the tailgate, thereby allowing the hydraulic system to be controlled. As a result, the hydraulic circuit is signaled to control the hydraulic system and thereby move the ejector based on a position of the ejector and the tailgate, wherein, in combination, the ejector and the tailgate control a load of material within the truck body.

In the method for controlling an ejector of a vehicle, the steps comprise: activating a pneumatic tailgate switch to thereby open tailgate latches and enable use of a hydraulic system and ejector signal processing system; extending the ejector, thereby pushing the material through the tailgate, as a result at least partially lifting the tailgate; in response to the tailgate lifting past a pre-set position, disabling the hydraulic system to thereby stop the ejector; and in response to the tailgate lowering into the pre-set position, re-activating the hydraulic system to thereby continue extension of the ejector, wherein the material is intermittently pushed through the tailgate and out from the vehicle.

DETAILED DESCRIPTION OF THE PREFERRED EMBODIMENT

Figure 10:
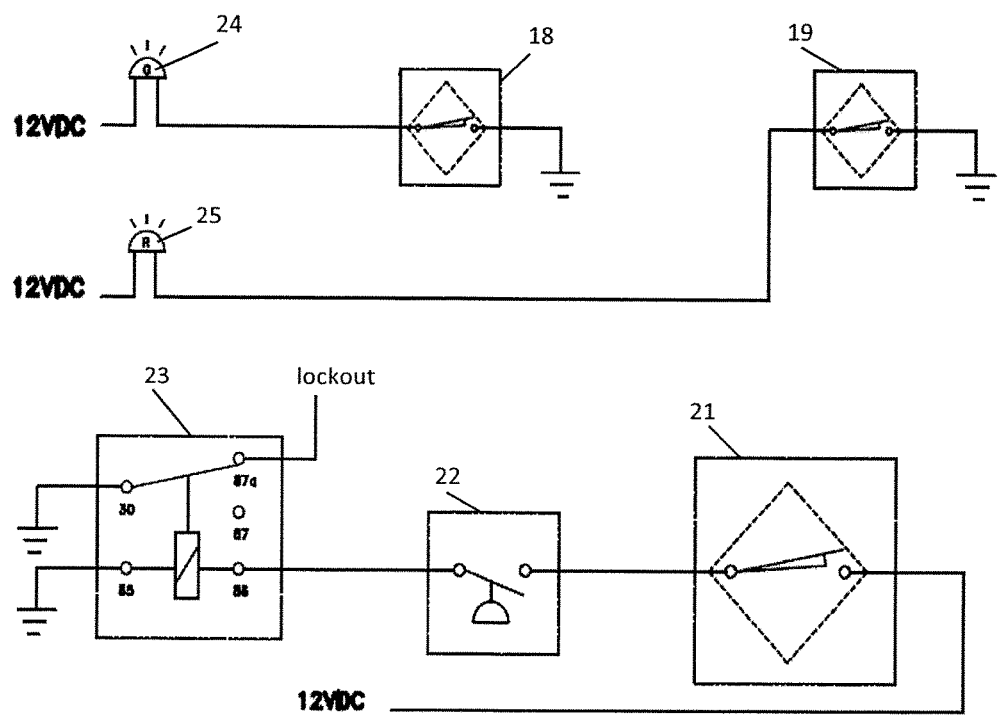
FIG. 10 shows a schematic of the ejector signal processing system for controlling the hydraulic circuit.
Figure 11:
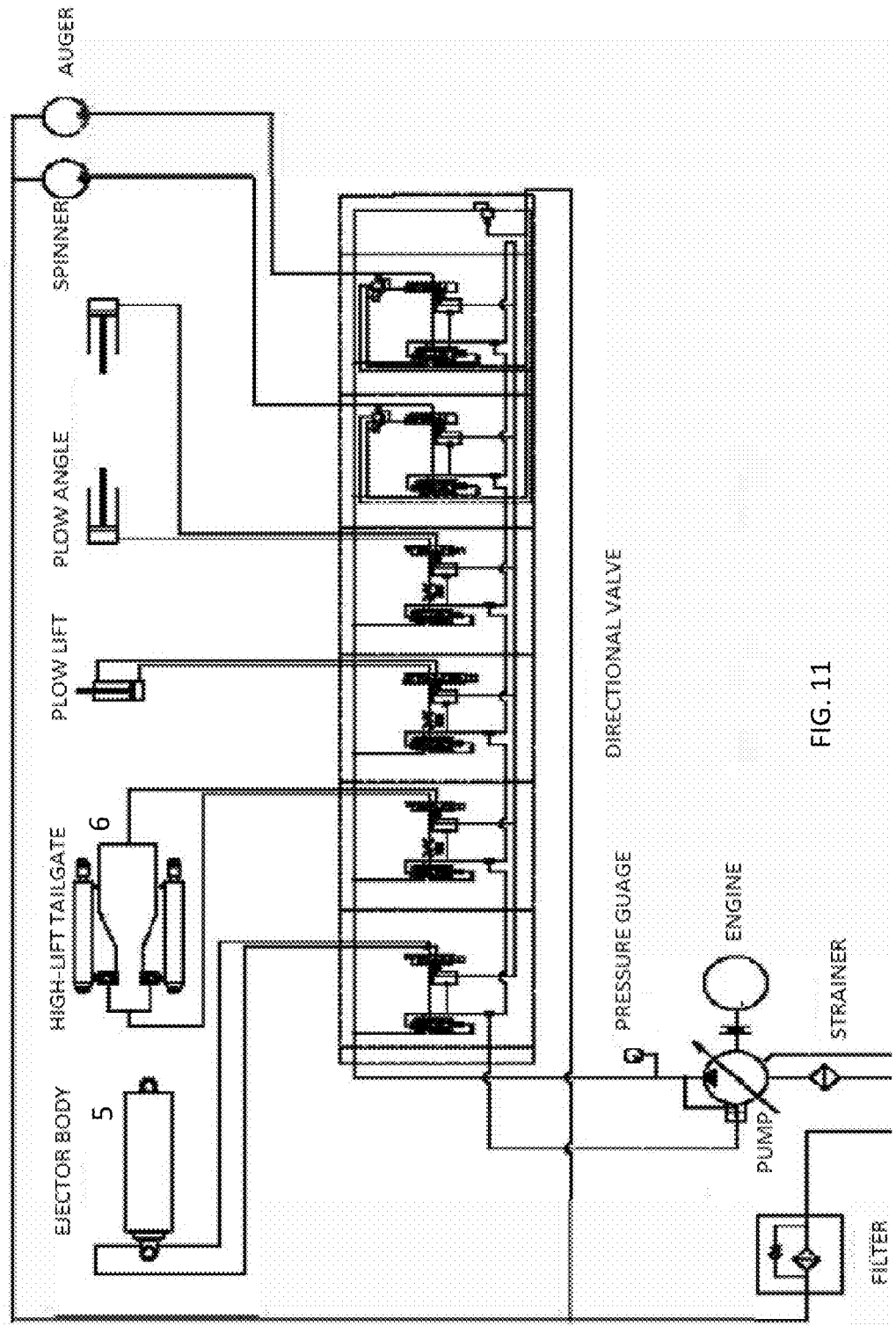
FIG. 11 shows a schematic of the hydraulic circuit.
Figure 12:
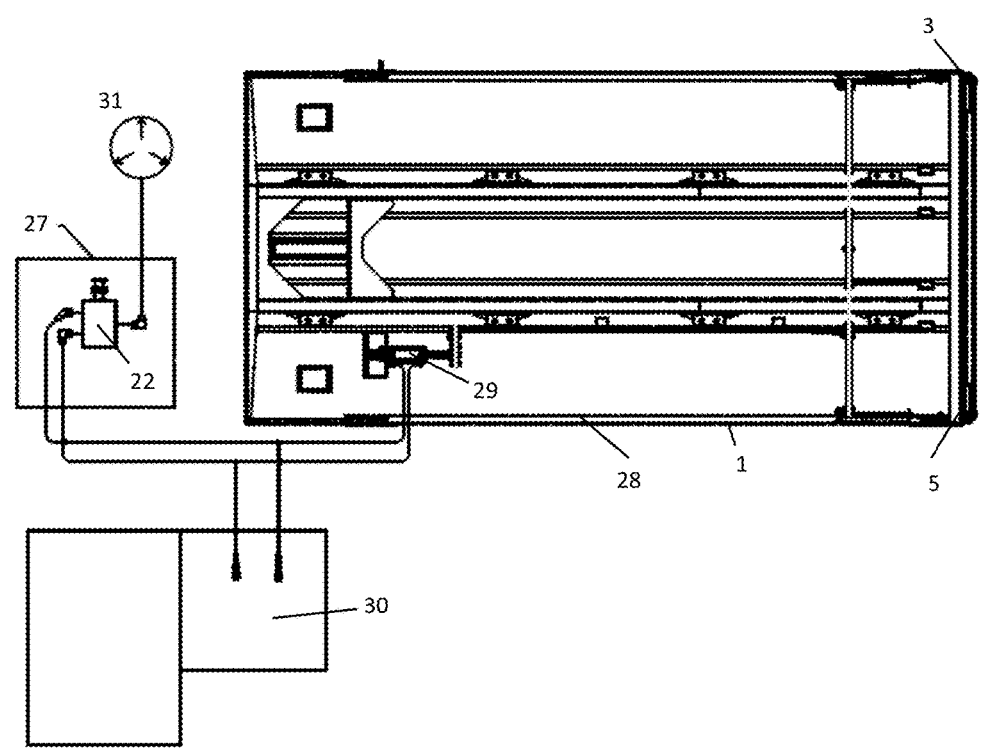
FIG. 12 shows a schematic of the tailgate bottom latch air circuit.

Referencing then FIGS. 1-13, shown is the instant invention comprising generally four subassemblies, namely the truck body 1, the tailgate 5, the ejector 6 with ejector cylinder 13, and the signaling systems, including the hydraulic circuit (FIG. 11) and ejector signal processing system 9 (FIG. 10).

As is customary, the truck body 1 is the container means for storing aggregate, for example road treatment particulates such as salt, anti-skid gravel or asphalt (as an example only). "Material" as used herein includes all of the aforementioned which can be handled, controlled and ejected from truck body 1 for any variety of applications such as snow and ice control or paving. At the back 3, below tailgate 5, a material hopper 16 can be disposed. As used herein, "hopper" is any receiving receptacle, capable of further disbursement, including but not limited to a paving machine (paving applications) or salt spreader (snow and ice control).

Figure 1:
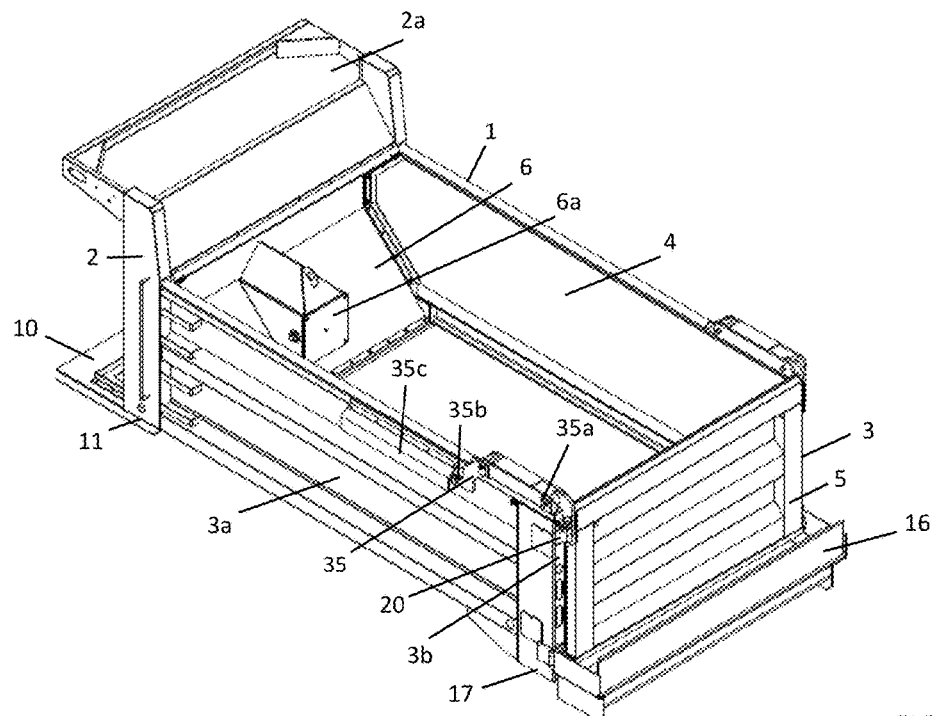
FIG. 1 shows a perspective view of the truck body as viewed from the back with the ejector body in its front-most, or fully retracted position.
Figure 2:
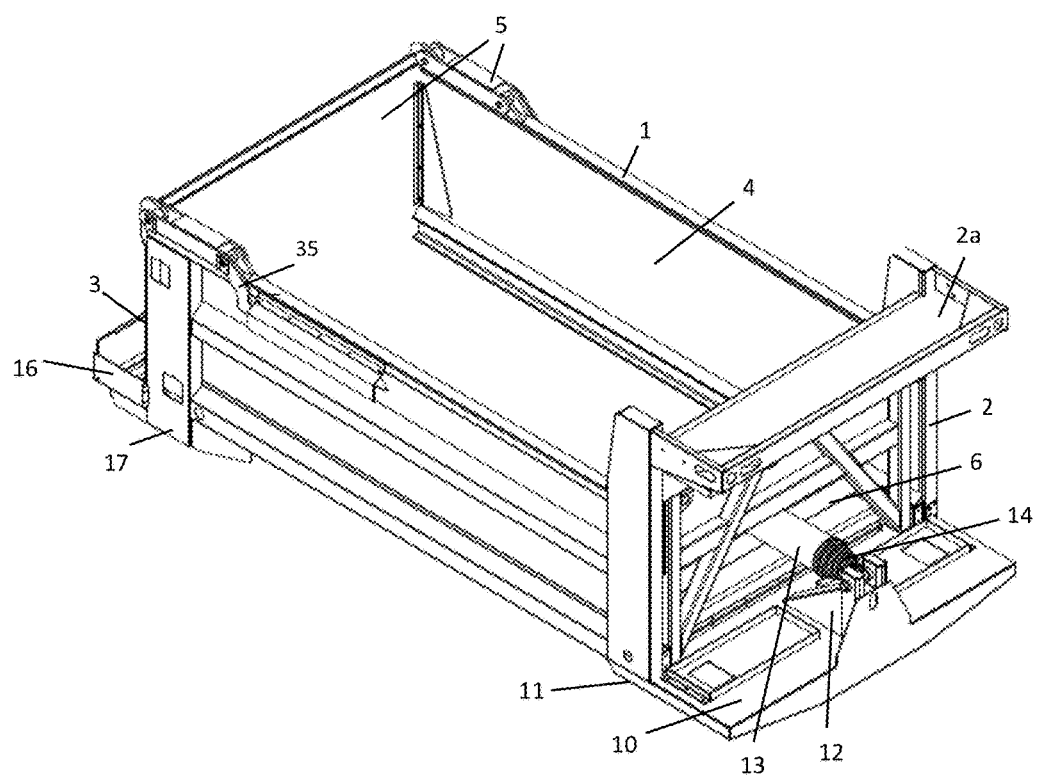
FIG. 2 shows a perspective view of the truck body as viewed from the front with the ejector body in the same fully retracted position.

Truck body 1 is typically mounted on the truck frame or chassis. Here, truck body 1 is fixed to the frame of the vehicle because it is not adapted to lift up. For instance the corners of the truck body 1 can be bolted to the truck chassis (not shown). Shown here is truck body 1 having front 2, back 3, a back edge 3b(rearward facing surface towards which the tailgate 5 closes) and interior 4. The front 2 is open, closed-off only when the ejector 6 is in a front-most, or fully-retracted position as depicted by FIG. 1. The lower portion, or front bottom 11 of truck body 1 extends from the front 2 such that a support plate 10 is formed. A mounting plate 12 upstands from support plate 10, here taking the form of a pair of parallel plates or rails for securing the ejector cylinder 13, as follows.

An ejector 6 is adapted to travel throughout the interior 4 of the truck body 1 in an axial direction relative to the front 2 and back 3 of the truck body 1, i.e. along the direction of the drive shaft of the truck/vehicle, away from and towards the tailgate 5. The shape of the ejector 6 may vary but preferably an angled front is formed. Additional implements can be attached to or formed integrally with the front to better urge material. Ejector 6 is actuated by ejector cylinder 13. Ejector cylinder 13 has its proximal end 14 attached to the mounting plate 12 and its distal end 15 connected to ejector 6, for instance through ejector housing 6a which provides a fixation point along the angled ejector 6. Ejector cylinder 13 is a hydraulic actuator, responsive to the fluid flow of hydraulic system, which in turn is responsive to hydraulic circuit (FIG. 11), signaled by ejector signaling processing system 9 (FIG. 10) as follows.

The hydraulic circuit (signaling component), or, interchangeably, hydraulic system (physical component), is signaled by an ejector signal processing system 9. Ejector signal processing system 9 is a means for signaling the hydraulic system to move the ejector 6. The means for signaling the hydraulic system can include the following: (1) a mechanical linkage (not shown) at the tailgate 5 further attached to a hydraulic valve that stops the flow of hydraulic oil to the ejector cylinder 13 when the linkage is under tension, and allows the flow of hydraulic oil to the ejector cylinder 13 when the linkage is relaxed; (2) a pressure sensor is in the hydraulic circuit that would monitor system pressure to signal the system to stop the hydraulic fluid being sent to the ejector cylinder 13 at a predetermined pressure, thus preventing further material from being forced into the material hopper 16 until such a time as the present material has been extinguished through the hopper 16; (3) the use of position transducer (LDT) can be used to monitor the tailgate hinge rotating a desired degree, at which time the flow of hydraulic fluid being sent to the ejector cylinder 13 would be stopped electrically, preventing further material from being forced into the hopper 16 until such a time as the present material has been extinguished through the hopper 16; (4) an absolute positioning system can be implemented on hydraulic cylinders used to extend the tailgate 5 to a pre-determined position, at which time the flow of hydraulic fluid being sent to the ejector cylinder 13 would be stopped electrically; (5) a pressure load cell with chain can monitor the force being placed on the tailgate 5 and signal electrically when the maximum load was reached, at which time the flow of hydraulic fluid being sent to the ejector cylinder would be stopped electrically; (6) a laser light in a tube can be attached to the tailgate 5 to monitor the force being placed on the tailgate 5, and when the beam of light would be interrupted due to deflection, the flow of hydraulic fluid being sent to the ejector cylinder 13 would be stopped electrically.

In the preferred embodiment, as shown, the means for signaling the hydraulic system is an ejector signal processing system 9, e.g. a circuit, which employs one or more proximity switches. As used herein, "signal processing" means an electrical circuit but can also be any type of wired, or non-wired communication or signaling method. Additionally, something in "electrical communication" is not limited to hard-wiring, although in the instant example the underbody 28 of the vehicle and/or truck body 1 itself is appropriately modified to include the wiring and hydraulic system. See FIGS. 11 and 12, for example, including reservoir 31, tank enclosure 30, cylinder 29. As used herein "switch" also refers to the sensor signaling the switch. For instance, a proximity sensor is able to detect the presence of nearby objects within a pre-set field, looking for changes in the field or return signal. Here, the object being sensed, or which are the sensors' target, are the ejector 6 and the tailgate 5, as follows.

A normally-open, front ejector proximity switch (or sensor) 18 is disposed at the front 2. The location of the front ejector proximity switch 18 can vary along the front 2. In the example shown at FIG. 9, the front ejector proximity switch 18 is shown on the frame of truck body 1, towards the front bottom 11. When the ejector 6 is within the field established by front ejector proximity switch 18, a first indicator light 24 is activated (see below). Thus, an operator can disable the hydraulic system. In the preferred embodiment the front ejector proximity switch 18 does not need to be in communication with the hydraulic system and the operator can manually disable the hydraulic system, although such automatic communication and auto-shut off is possible. In either instance, at its front-most position the ejector 6 is not receiving fluid flow, thereby ejector 6 is stationary in its fully-retracted position. So front ejector proximity switch 18 is adapted to detect the ejector 6 being in a front-most, fully retracted position, i.e. with un-extended ejector cylinder 13.

A normally-open, rear ejector proximity switch 19 is disposed at the back 3 of truck body 1, similarly mounted on the frame of truck body 1. With ejector 6 at its fully-extended position at the rear of truck body 1, hydraulic system is disabled automatically to limit further capability of movement by the ejector 6 as the ejector signal processing system 9 is reading the proximity of the ejector 6 at this rear-most position.

Thirdly, a normally-open, tailgate proximity switch 21 is preferably mounted to a projecting member 20, which is attached to the back 3 and extends axially rearward away from back 3 as shown by FIGS. 4 - 8. Tailgate proximity switch 21 reads a sensor plate 20a on the side of the tailgate 5. When the tailgate 5 swings outward and thus sensor plate 20a passes beyond the field of tailgate proximity switch 21 projecting from projecting member 20, in a similar manner fluid flow is cut-off to the hydraulic system to thereby stop ejector 6 from continuing to move forward, as result prohibiting the continued push-out of material.

Figure 8:
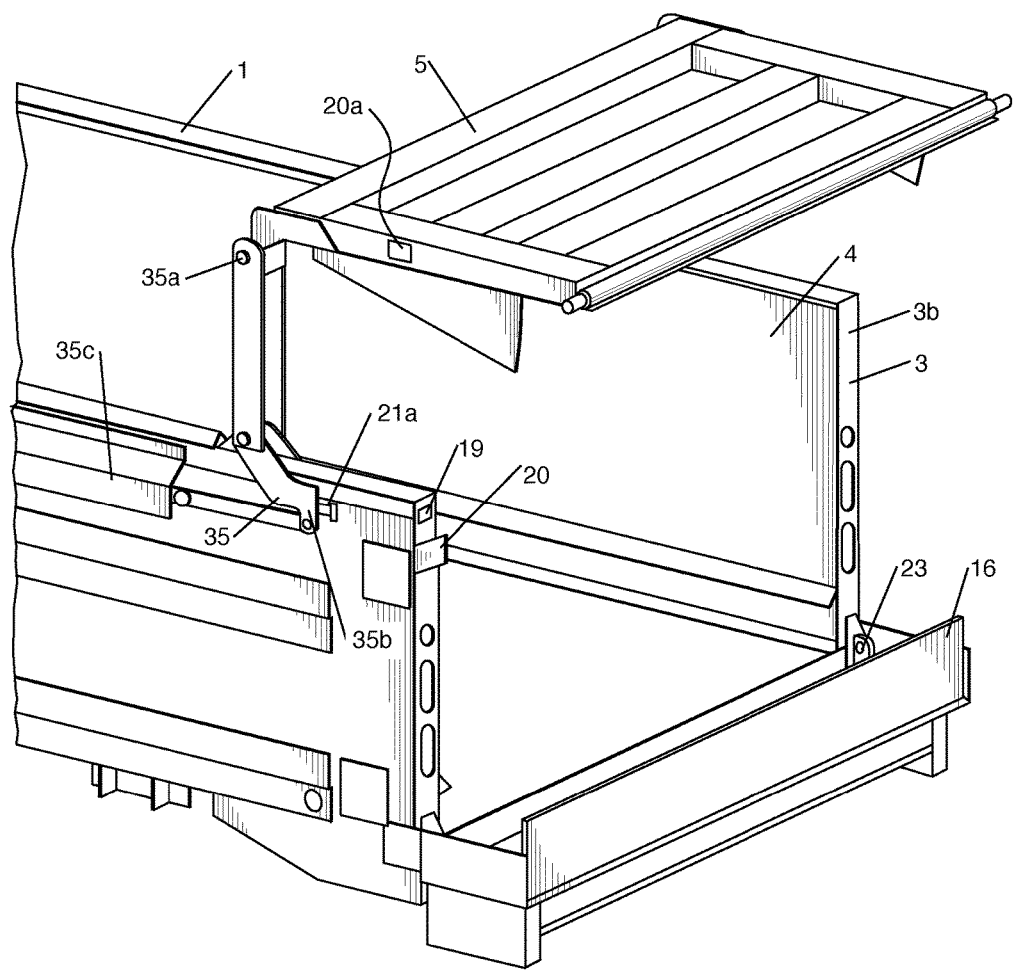
FIG. 8 shows a perspective view of the tailgate in the fully open position.
Figure 9:
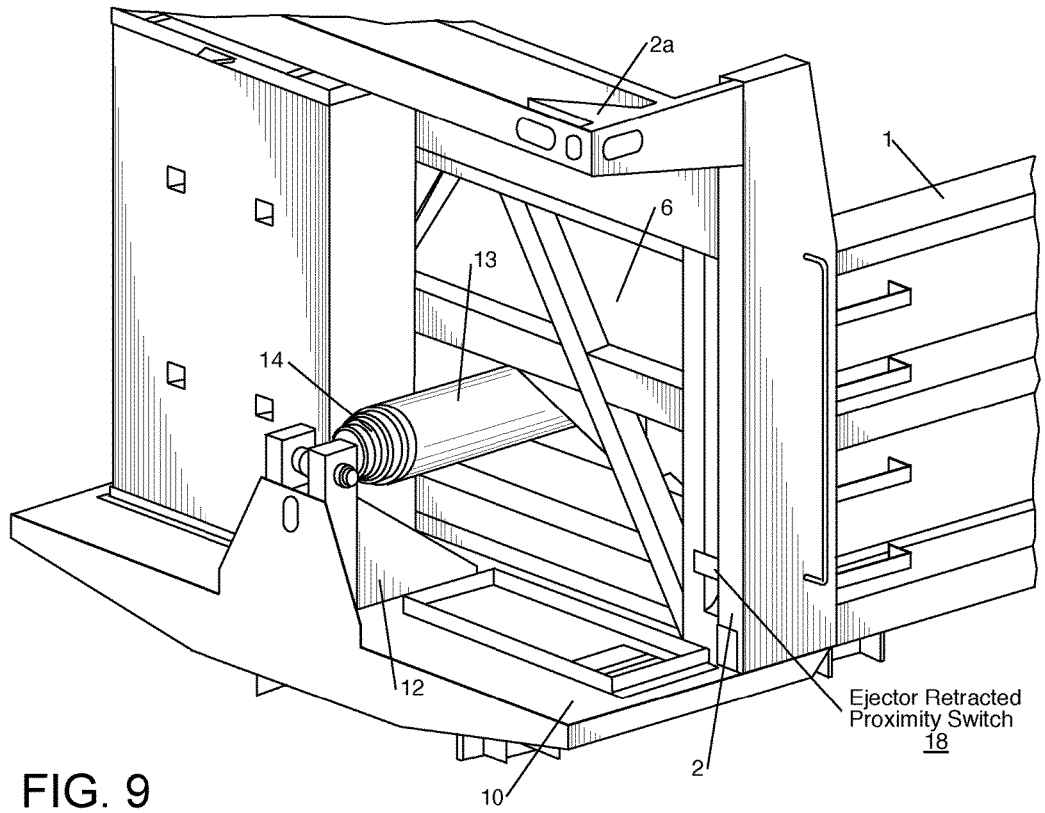
FIG. 9 shows a perspective view of the position of the front ejector proximity switch.

The tailgate 5 includes a pair of side arms 35. Each side arm 35 has a first end 35a connected to the tailgate 5 and a second end 35b movably connected to the side 3a of the truck body 1 (near or under shielding side arm cover 35c) such that a movable connection between the tailgate 5 and the truck body 1 is maintained. The tailgate 5 is moved by the side arms 35 (by hydraulic piston as is known) and configured to operate in a standard mode and a high lift mode. In the above standard mode, first end 35a is stationary and the tailgate 5 swings outward a nominal distance and is thus partially open, for instance to the edge of the material hopper 16 since only the hopper 16 is being filled. See FIGS. 3 and 6 for example. In an alternative mode, termed herein "high lift" tailgate mode, the tailgate 5, being a standard high lift gate as is known in the art, is configured to lift fully upward, as depicted by FIG. 8. Such is desirable for larger material handling or faster unloading requirements or other applications. As a result of this configuration, the second end 35b of side arm 35 is pulled upward and thereby the tailgate 5 would lift considerably past and remain outside the field 5 established by tailgate proximity switch 21. To re-enable the hydraulic system in this instance, a sensor rod 21a is provided on the truck body 1, e.g. along the side 3a. The sensor rod 21a is in alignment with second end 35b of side arms 35 of high lift tailgate 5. Similar to a proximity switch, the sensor rod 21a sets a field and senses the location of the approaching side arms 35 of the tailgate 5, i.e. as the high lift tailgate 5 lifts upward its side arms 35 would slide rearward as it pivots. See FIG. 8. The sensor rod 21a now reads the side arms 35 as the target (instead of the tailgate 5 itself). The sensor rod 21a, being in electrical communication with the hydraulic circuit, re-signals the hydraulic system, meaning hydraulic flow is achieved again even after it has been previously disabled by the tailgate proximity switch 21, thereby re-controlling ejector 6.

Figure 3:
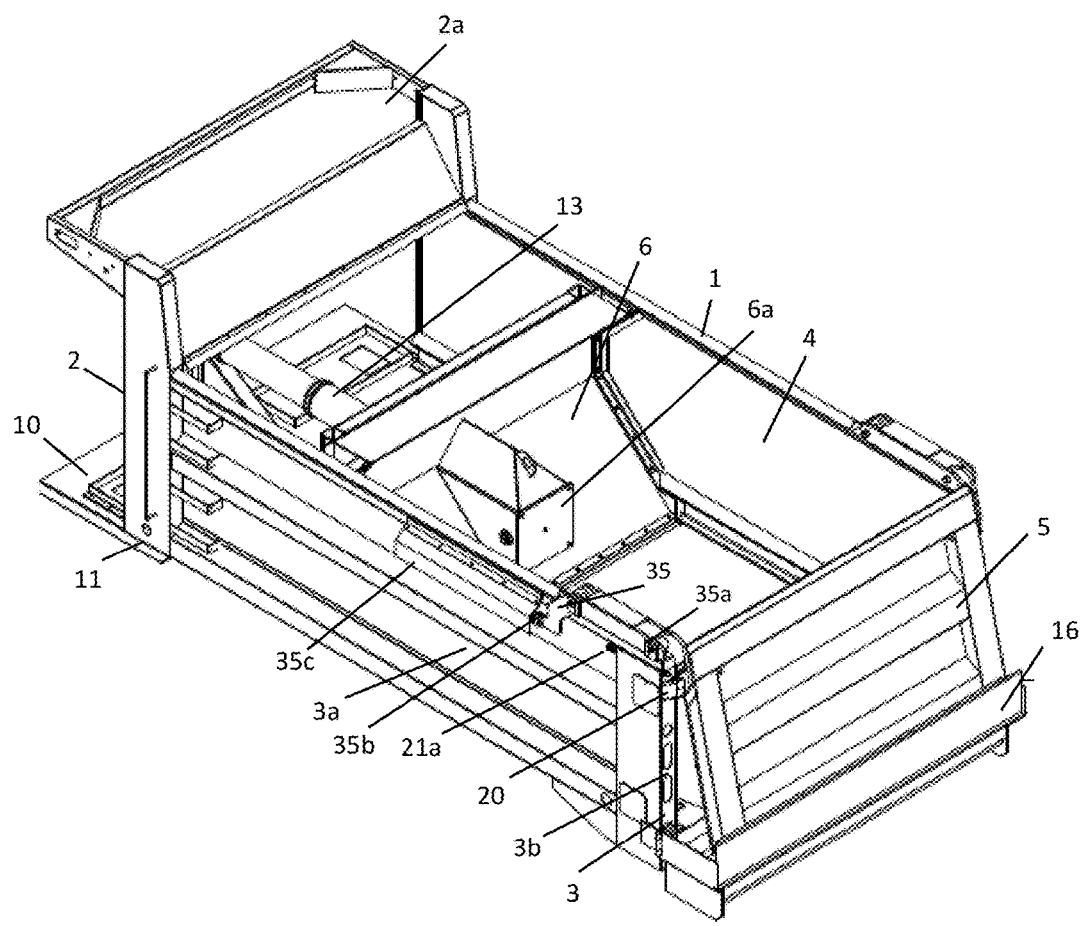
FIG. 3 shows a perspective view of the truck body with the ejector body having traveled part of the way through the truck body and tailgate partially open.
Figure 4:
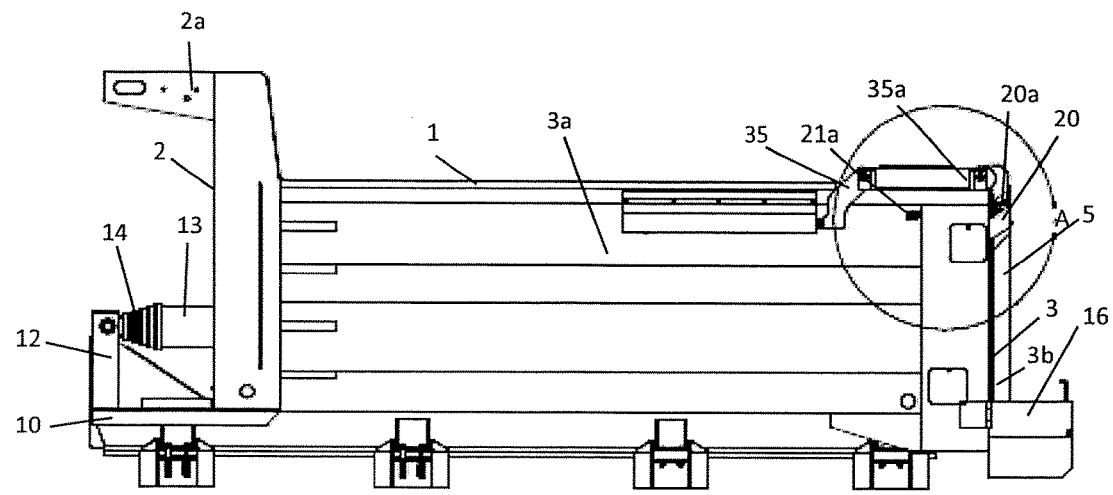
FIG. 4 shows a side view in elevation of the truck body having detail A at the upper rear.
Figure 5:
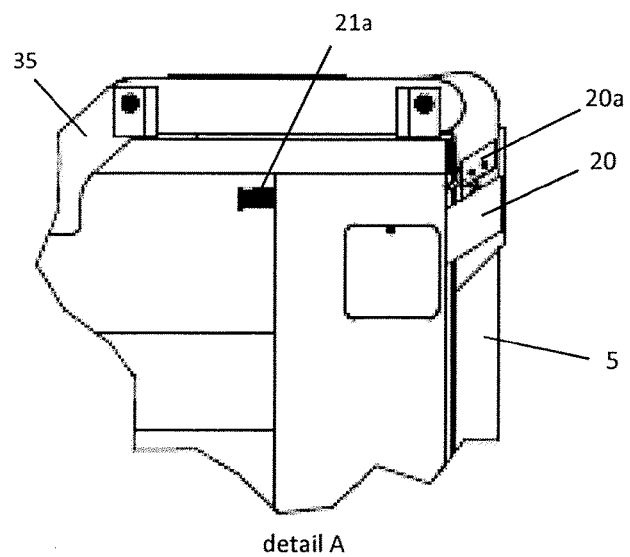
FIG. 5 is a blow-up of detail A of FIG. 4.
Figure 6:
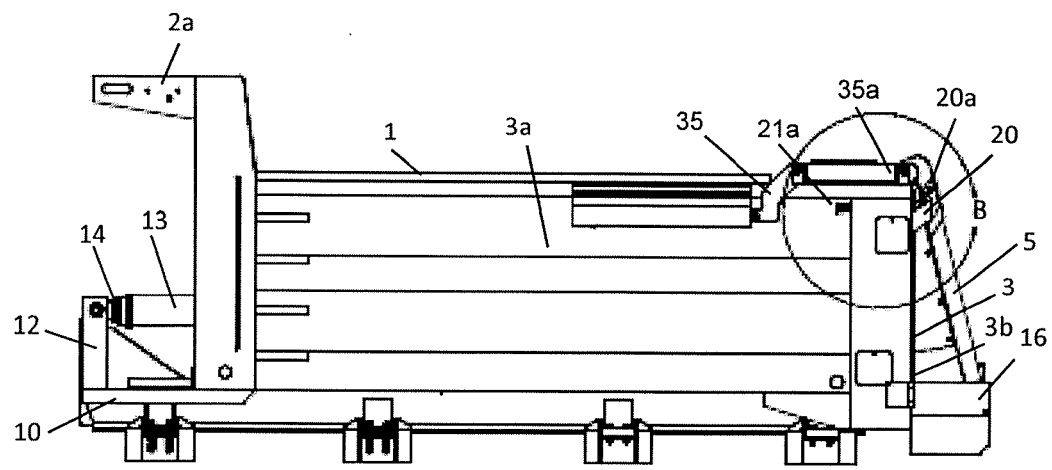
FIG. 6 shows a side view in elevation of the truck body having detail B at the upper rear and with the tailgate in the partially open position.
Figure 7:
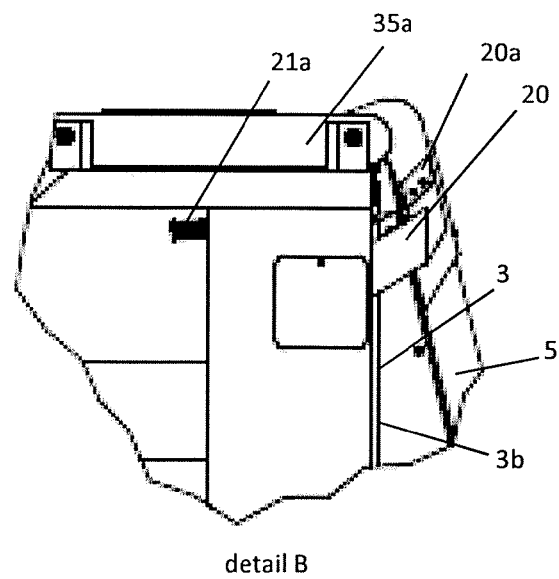
FIG. 7 is a blow-up of detail B of FIG. 6.

The pneumatic tailgate switch 22 is operator controlled from the cab 27 of the vehicle. Pneumatic tailgate switch 22, communicating with tailgate proximity switch 21, is in further communication with tailgate latches 23. Any type of latching mechanism can be used for the tailgate 5 and vary in location thereon. Example tailgate latch 23 here is shown in FIG. 3 but also diagrammatically depicted in FIG. 10 as a relay, e.g. a latching relay. Activating the pneumatic tailgate switch 22 thereby opens tailgate latch 23 and further enables use of the hydraulic system and ejector signal processing system 9 (see FIG. 10). In this manner, the ability to control the ejector 6 and the tailgate 5 and thus the ability to control the material is only available when the pneumatic tailgate switch 22 is activated.

Figure 13:
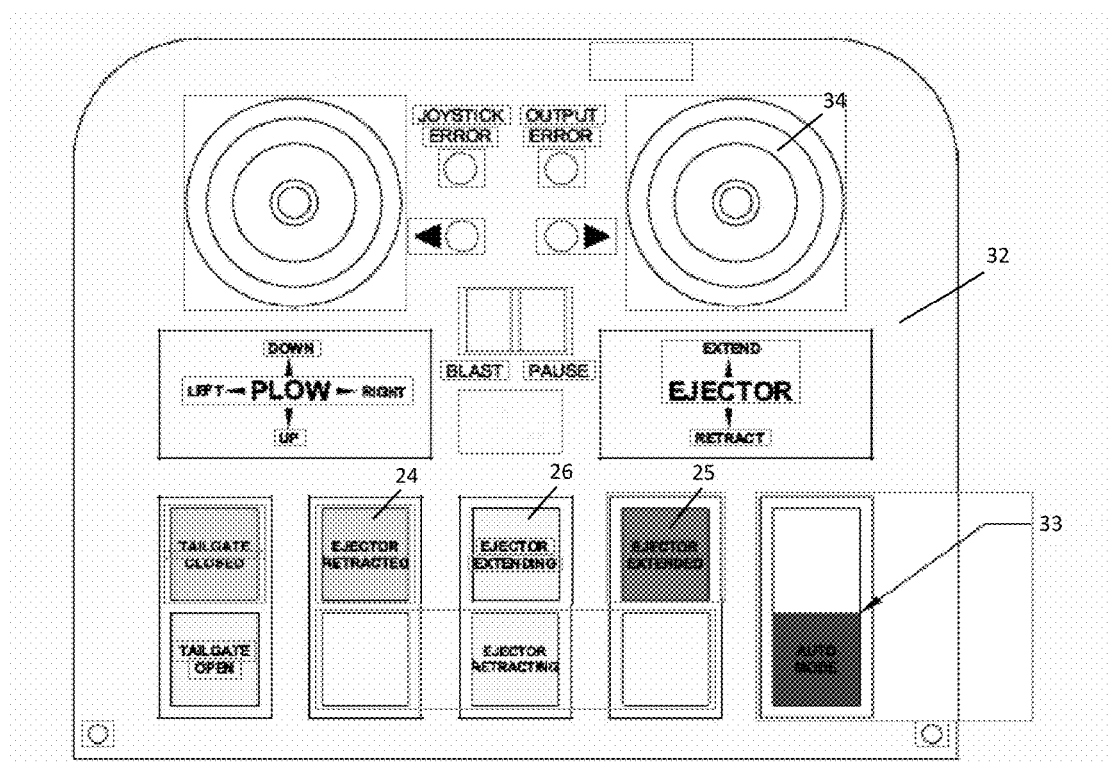
FIG. 13 shows a diagrammatic illustration of the indicator and control panel.

A combination of indicator lights are located within the truck chassis cab 27 as a means for cuing the operator. For instance an indicator and control panel 32 is within the cab 27, accessible by operator (see FIG. 13). The indicator lights and controls are in electrical communication with the pneumatic pressure switches in the pneumatic circuit and proximity switches in the electric circuit above. More particularly, included is a first indicator light 24 in electrical communication with the front ejector proximity switch 18. This first indicator light 24 illuminates when the front ejector proximity switch 18 is closed, wherein the first indicator light 24 is indicating and cuing the operator that the ejector 6 is in the fully retracted position. As an example, this first indicator light 24 can illuminate with green color. A second indicator light 25 is in electrical communication with the rear ejector proximity switch 19. The second indicator light 25 illuminates, for example red, when the rear ejector proximity switch 19 is closed, wherein the second indicator light 25 is indicating and cuing the operator that the ejector 6 is in a fully extended position. Thirdly, a third indicator light 26 is in electrical communication with the ejector 6, the third indicator light 6 illuminated and cuing the operator when the ejector 6 is in motion. Other variations of lights and controls are contemplated. Shown here as example by FIG. 13 is an indicator and control panel 32 having joysticks to control the ejector 6. As a result of the system configurations above, the ejector 6 can be controlled using the joysticks in a manual mode or, critically, in an auto-mode (auto-feed on/off 33).

The combination of proximity switches 18, 19, 20a, 21 allow for the auto-mode because the ejector signal processing system 9 comprising these switches and circuits as described controls the movement of the ejector 6 based on a position of the ejector 6 and the tailgate 5, wherein, in combination, the ejector 6 and the tailgate 5 actually control the load of material within the truck body 1 with little to no operator-required intervention. This is advantageous because the vehicle operator can focus on operating the vehicle instead of both the vehicle and the load handling system.

Below as an example is a summary of the order of operations depicting the instant method of controlling the ejectment system for various applications and in various modes, including auto mode.

EXAMPLE

Order of Operation—Snow & Ice Road Surface Treatment

1. Load aggregate (salt, anti-skid gravel, cinders etc.) into the truck body
   a. Ejector is in the fully retracted position at the front of the body, tailgate latches are closed and ejector hydraulic circuit is disabled via pneumatic pressure switch signal (or other means)
      i. Operator cues—Indicator lights in cab
         1. Green light—TAILGATE CLOSED
         2. Green light—EJECTOR RETRACTED 2. Begin treating road surface utilizing the chassis hydraulic system, ejector, snow plow and tailgate spreader.
   a. Turn power take off (PTO) switch "ON"
      i. Special note: Load-sense hydraulic systems directly driven may not require PTO engagement
   b. Activate pneumatic Tailgate switch to open tailgate latches. Opening the tailgate latches enables use of the ejector hydraulic circuit via pressure switch signal (or other means).
      i. Operator cue—Indicator lights in cab
         1. Tailgate indicator light switches from green (TAILGATE CLOSED) to amber (TAILGATE OPEN).
   c. Turn on spreader control and set auger and spinner to desired application rate.
   d. Discharge material from the body into the spreader hopper by extending the ejector to treat road surface.

i. MANUAL EJECTOR OPERATION
1. Activate "Manual Mode" switch on hydraulic system controller
2. Push in the joystick "Deadman" switch and pull back on the joystick to extend the ejector.
   a. Ejected material pushes tailgate away from the body and over the tailgate hopper to a pre-set position. The ejector hydraulic circuit is disabled via proximity switch signal (or other means) once the tailgate reaches the pre-set position over the spreader hopper. The spreader is full.
   b. As material is discharged out of the spreader hopper, the tailgate returns to a closed position and the ejector hydraulic circuit is re-activated by proximity switch signal (or other means), allowing the operator to again extend the ejector and load the spreader hopper.
   c. Operator cues—Indicator lights in the cab
      i. Ejector indicator lights switch from green (EJECTOR RETRACTED) to amber (EJECTOR EXTENDING). The amber light is "ON" while the ejector is moving and turns "OFF" when the ejector stops.
3. Continue treating the road surface until the body is completely empty and the ejector is fully extended.
   a. Operator cues—Indicator lights in the cab
      i. Ejector indicator lights switch from amber (EJECTOR EXTENDING) to blinking red (EJECTOR EXTENDED).
4. Retract ejector and prepare body for reload.
   a. Push in the joystick "Deadman" switch and push the joystick forward to retract the ejector until ejector is fully retracted.
      i. Operator cues—Indicator lights in the cab
         1. Ejector indicator lights switch from blinking red (EJECTOR EXTENDED) to amber (EJECTOR RETRACTING) to green (EJECTOR RETRACTED).
   b. De-activate pneumatic Tailgate switch to close tailgate latches. Closing the tailgate latches disables use of the ejector hydraulic circuit via pressure switch signal (or other means).
      i. Operator cue—Indicator lights in cab
         1. Tailgate indicator light switches from amber (TAILGATE OPEN) to green (TAILGATE CLOSED).
   c. Disengage PTO switch
5. Re-load ejector body ii. AUTOFEED (AUTOMATIC) EJECTOR OPERATION
1. Activate AUTO MODE switch on hydraulic system controller
2. Push in the joystick "Deadman" switch and pull back on the joystick for more than 5 seconds to engage AUTOFEED and extend the ejector.
   a. Ejected material pushes tailgate away from the body and over the tailgate hopper to a pre-set position. The ejector hydraulic circuit is disabled via proximity switch signal (or other means) once the tailgate reaches the pre-set position over the spreader hopper. The spreader is full.
      i. Operator cues—Indicator lights in the cab
         1. Ejector indicator lights switch from green (EJECTOR RETRACTED) to amber (EJECTOR EXTENDING). The amber light is "ON" while the ejector is moving and turns "OFF" when the ejector stops.
   b. As material is discharged out of the spreader hopper, the tailgate returns to a closed position, the ejector hydraulic circuit is re-activated by proximity switch signal (or other means), automatically extending the ejector to load the spreader hopper.
      i. NOTE: AUTOFEED is instantly disabled by pushing the ejector joystick forward.
      ii. Operator cues—Indicator lights in the cab
         1. Amber EJECTOR EXTENDING light is "Off" when the ejector hydraulic circuit is disabled and "On" when the circuit is enabled and the ejector is moving
3. Continue treating the road surface until the body is completely empty and the ejector is fully extended.
   a. Operator cues—Indicator lights in the cab
      i. Ejector indicator lights switch from amber (EJECTOR EXTENDING) to blinking red (EJECTOR EXTENDED).
4. Retract ejector and prepare body for reload.
   a. Push in the joystick "Deadman" switch and push the joystick forward to retract the ejector until ejector is fully retracted.
      i. Operator cues—Indicator lights in the cab
         1. Ejector indicator lights switch from blinking red (EJECTOR EXTENDED) to amber (EJECTOR RETRACTING) to green (EJECTOR RETRACTED).
   b. De-activate pneumatic Tailgate switch to close tailgate latches. Closing the tailgate latches disables use of the ejector hydraulic circuit via pressure switch signal (or other means).
      i. Operator cue—Indicator lights in cab
         1. Tailgate indicator light switches from amber (TAILGATE OPEN) to green (TAILGATE CLOSED).
   c. Disengage PTO switch
5. Re-load ejector body

We claim:
1. An ejection system for a vehicle, comprising:
a truck body having a front, a back, a back edge, a side and an interior;
a tailgate at said back, said tailgate including a side arm, said side arm having a first end connected to said tailgate and a second end movably connected to said side of said truck body such that a movable connection between said tailgate and said truck body is maintained;

said tailgate configured to operate in a standard mode and a high lift mode, wherein in said high lift mode said first end and thereby said tailgate lifts upwards and away from said back;

a sensor plate on said tailgate;

a projecting member attached to said truck body along said back edge, said projecting member extending rearward towards said tailgate;

a tailgate proximity switch disposed on said projecting member, said tailgate proximity switch adapted to read said sensor plate and thereby detect a location of said tailgate in said standard mode;

a sensor rod on said side of said truck body, said sensor rod in alignment with said second end of said side arm for detecting said tailgate in said high lift mode when said second end has pushed rearward and said first end, and thereby said tailgate, has moved upward and away from said tailgate proximity switch;

an ejector adapted to travel axially through said interior from said front to said back;

a hydraulic system for moving said ejector; and, wherein said hydraulic system can be signaled by both said tailgate proximity switch and said sensor rod to move said ejector based on a position of said ejector and said tailgate, wherein, in combination, said ejector and said tailgate control a load of material within said truck body.

2. The ejection system of claim 1, further comprising a support plate extending from a front bottom of said front of said truck body and a mounting plate upstanding from said support plate.

3. The ejection system of claim 2, further comprising an ejector cylinder responsive to said hydraulic system, said ejector cylinder having a proximal end and a distal end, said distal end connected to said ejector through said front and said proximal end connected to said mounting plate.

4. The ejection system of claim 1, further comprising a material hopper attached to said back of said truck body below said tailgate, said material hopper adapted to contain and disperse a portion of said material when said material is urged from said truck body as said ejector moves toward said back.

5. The ejection system of claim 1, further comprising a front ejector proximity switch disposed at said front, said front ejector proximity switch adapted to detect said ejector being in said fully retracted position.

6. The ejection system of claim 5, including a first indicator light in electrical communication with said front ejector proximity switch, said first indicator light illuminating when said front ejector proximity switch is closed, wherein said first indicator light is indicating said ejector is in said fully retracted position.

7. The ejection system of claim 6, including a second indicator light in electrical communication with said rear ejector proximity switch, said second indicator light illuminating when said rear ejector proximity switch is closed, wherein said second indicator light is indicating said ejector is in a fully extended position.

8. The ejection system of claim 1, further comprising a rear ejector proximity switch disposed at said back, said rear ejector proximity switch adapted to detect said ejector being in a fully extended position.

9. The ejection system of claim 1, further comprising a pneumatic tailgate switch, said pneumatic tailgate switch in electrical communication with said tailgate proximity switch.

10. The ejection system of claim 9, further comprising a tailgate latch responsive to said pneumatic tailgate switch for allowing operation of said tailgate.

* * * * *